(12) United States Patent
Blackwell et al.

(10) Patent No.: US 10,180,036 B2
(45) Date of Patent: Jan. 15, 2019

(54) DRILLING FLUID DISPOSAL INJECTION SYSTEM AND METHOD

(71) Applicant: Milestone Environmental Services, LLC., Houston, TX (US)

(72) Inventors: Mark Blackwell, Houston, TX (US); Steve Bills, Houston, TX (US); Jason Larchar, Spring, TX (US)

(73) Assignee: MILESTONE ENVIRONMENTAL SERVICES, LLC., Houston, TX (US)

( * ) Notice: Subject to any disclaimer, the term of this patent is extended or adjusted under 35 U.S.C. 154(b) by 0 days.

(21) Appl. No.: 15/662,991

(22) Filed: Jul. 28, 2017

(65) Prior Publication Data

US 2017/0335642 A1 Nov. 23, 2017

Related U.S. Application Data

(63) Continuation-in-part of application No. 15/596,580, filed on May 16, 2017.

(60) Provisional application No. 62/337,523, filed on May 17, 2016, provisional application No. 62/367,816, filed on Jul. 28, 2016.

(51) Int. Cl.
| | |
|---|---|
| *E21B 21/06* | (2006.01) |
| *E21B 41/00* | (2006.01) |
| *E21B 49/00* | (2006.01) |
| *G05B 15/02* | (2006.01) |

(52) U.S. Cl.
CPC ............ *E21B 21/06* (2013.01); *E21B 21/066* (2013.01); *E21B 41/0057* (2013.01); *E21B 49/00* (2013.01); *E21B 49/006* (2013.01); *G05B 15/02* (2013.01)

(58) Field of Classification Search
CPC .. E21B 21/006; E21B 41/0057; E21B 21/065; E21B 21/062; E21B 21/066
See application file for complete search history.

(56) References Cited

U.S. PATENT DOCUMENTS

| | | | | |
|---|---|---|---|---|
| 5,589,603 A | * | 12/1996 | Alexander | .............. B09B 1/008 166/305.1 |
| 2014/0371113 A1 | * | 12/2014 | Fout | ...................... E21B 21/066 507/117 |

* cited by examiner

*Primary Examiner* — Catherine Loikith
(74) *Attorney, Agent, or Firm* — MH2 Technology Law Group LLP (57) ABSTRACT

A portion of a drilling fluid waste is injected into a well. A cross-sectional dimension of solids in a slurry is reduced. The slurry includes the drilling fluid waste. A property of the slurry, of the well, or both is measured. A model is obtained based at least partially upon the property. The model represents an interaction of the slurry with the well. An additive is introduced into the slurry in response to measuring the property, generating the model, or both. The slurry is injected into the well after the additive is introduced.

22 Claims, 5 Drawing Sheets

DRILLING FLUID DISPOSAL INJECTION SYSTEM AND METHOD

CROSS-REFERENCE TO RELATED APPLICATIONS

This application is a continuation-in-part of U.S. patent application Ser. No. 15/596,580, filed on May 16, 2017, which claims priority to U.S. Provisional Patent Application No. 62/337,523, filed on May 17, 2016. This application also claims priority to U.S. Provisional Patent Application No. 62/367,816, filed on Jul. 28, 2016. Each of these priority applications is incorporated herein by reference in its entirety.

BACKGROUND

When drilling a wellbore in a subterranean formation, a fluid is pumped down into the wellbore to cool the drill bit and to circulate cuttings from the subterranean formation back to the surface. This fluid with cuttings is referred to as a drilling fluid waste. The drilling fluid waste may present environmental liabilities and be expensive to dispose of at the surface. As a result, it may be desirable to dispose of the drilling fluid waste by pumping the drilling fluid waste back into the subterranean formation. However, particles in the drilling fluid waste may fall out of the drilling fluid waste if the density and/or viscosity of the drilling fluid waste is not within a predetermined range. This may limit the amount of drilling waste fluid that may be pumped back into the subterranean formation.

SUMMARY

A method for injecting a portion of a drilling fluid waste into a well is disclosed. The method includes reducing a cross-sectional dimension of solids in a slurry. The slurry includes the drilling fluid waste. The method also includes measuring a property of the slurry, of the well, or both. The method also includes obtaining a model based at least partially upon the property. The model represents an interaction of the slurry with the well. The method also includes introducing an additive into the slurry in response to measuring the property, generating the model, or both. The method also includes injecting the slurry into the well after the additive is introduced.

In another embodiment, the method includes reducing a cross-sectional dimension of solids in a slurry. The slurry includes the drilling fluid waste. The method also includes measuring a first property of the slurry after the cross-sectional dimension is reduced. The method also includes measuring a second property of the well. The method also includes obtaining a model based at least partially upon the first property and the second property. The model represents an interaction of the slurry with the well. The method also includes determining, in response to the model, a disposal capacity of the well or a maximum rate at which the slurry is injected into the well without causing a pressure in the well to exceed a predetermined amount. The method also includes introducing an additive to the slurry in response to determining the disposal capacity or the maximum rate. The method also includes injecting the slurry into the well after the additive is introduced.

A computing system is also disclosed. The computing system includes one or more processors and a memory system. The memory system includes one or more non-transitory computer-readable media storing instructions that, when executed by at least one of the one or more processors, cause the computing system to perform operations. The operations include reducing a cross-sectional dimension of solids in a slurry. The slurry includes a drilling fluid waste. The operations also include measuring a first property of the slurry after the cross-sectional dimension is reduced. The operations also include measuring a second property of a well. The operations also include obtaining a model based at least partially upon the first property and the second property. The model represents an interaction of the slurry with the well. The operations also include determining, in response to the model, a disposal capacity of the well or a maximum rate at which the slurry is injected into the well without causing a pressure in the well to exceed a predetermined amount. The operations also include introducing an additive to the slurry in response to determining the disposal capacity or the maximum rate. The operations also include injecting the slurry into the well after the additive is introduced.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. The embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Finally, unless otherwise provided herein, "or" statements are intended to be non-exclusive; for example, the statement "A or B" should be considered to mean "A, B, or both A and B."

Embodiments of the present disclosure may provide a system and method for injecting a portion of a drilling fluid waste back into a subterranean formation. The method includes separating larger particles from the drilling fluid waste, reducing a size of the larger particles after separation, re-combining the reduced-in-size particles with the remainder of the drilling fluid waste to produce a slurry, and injecting the slurry into a disposal well (also called an injection well). The properties of the slurry may be measured, and additives may be added to the slurry in response to the measurements. In some embodiments, a model may be generated using the measurements, and one or more valves may be actuated, and/or the additives may be added, in response to the model to control a property of the slurry.

Figure 1:
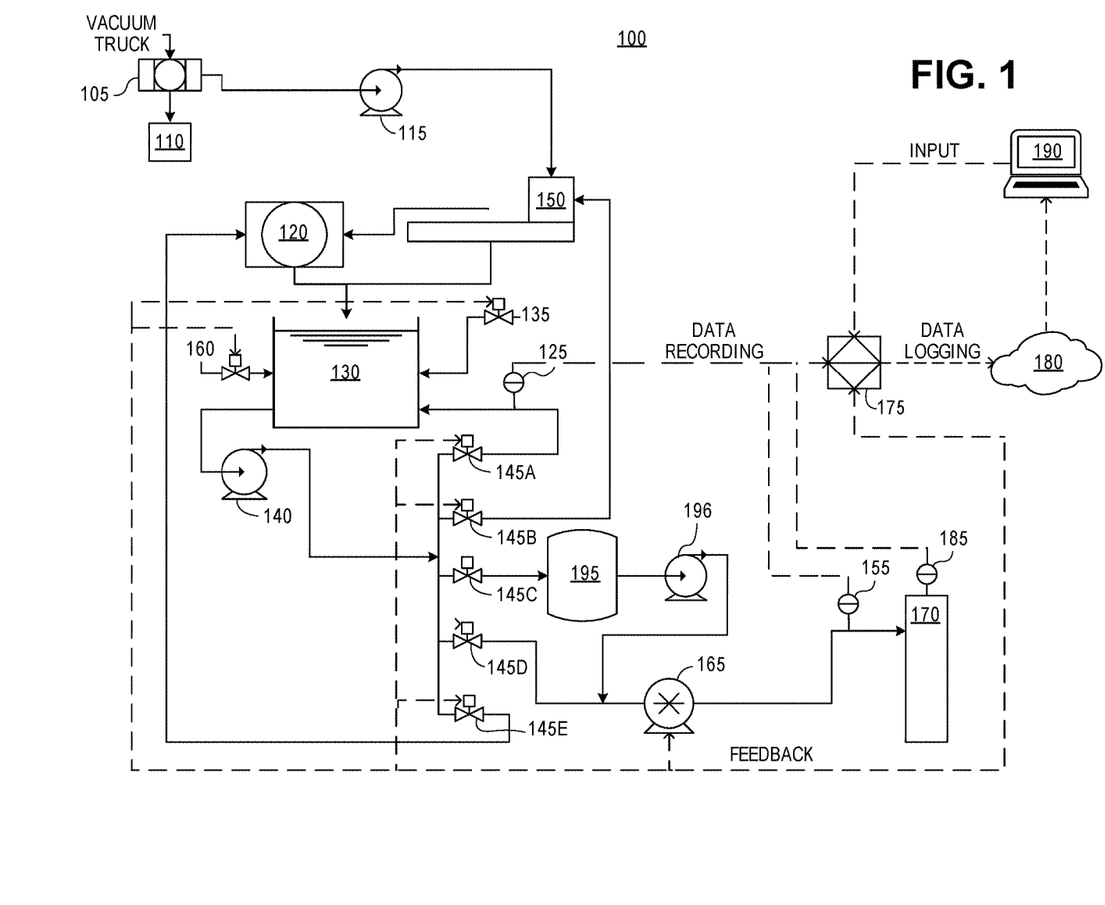
FIG. 1 illustrates a schematic view of a fluid disposal injection system, according to an embodiment.

FIG. 1 illustrates a schematic view of a fluid disposal injection system 100, according to an embodiment. The system 100 may be used to produce a slurry from drilling fluids and other additives to ensure efficient waste disposal. The system 100 may include a strainer 105 that receives drilling fluid waste from a wellbore, e.g., the strainer 105 may receive the drilling fluid waste from a vacuum truck, or may be part of a vacuum truck.

The strainer 105 may be configured to filter/separate a first set of solids (e.g., stones, nuts, bolts, rags, gloves, etc.) from the drilling fluid waste that may be harmful to the processing equipment. In one embodiment, the strainer 105 may separate solids from the drilling fluid waste that have a maximum cross-sectional dimension that is greater than or equal to about 0.25 inches or about 0.375 inches. This may produce (1) a removed first set of solids and (2) a first filtered drilling fluid waste. The removed first set of solids output from the strainer 105 may be transferred into a debris disposal unit 110. The debris disposal unit 110 may include bins or other waste collection receptacles that accumulate debris from the strainer 105. The first filtered drilling fluid waste output from the strainer 105 may be pumped to a shaker 150 via a pump 115.

The shaker 150 may be or include a shale shaker, a centrifuge, a filter, a strainer basket, a sieve, or the like. The shaker 150 may filter/separate a second set of solids (e.g., particles) from the first filtered drilling fluid waste that have a maximum cross-sectional dimension that is greater than about 100 microns, greater than about 200 microns, greater than about 300 microns, greater than about 400 microns, greater than about 500 microns, or larger. This may produce a removed second set of solids (e.g., particles) and a second filtered drilling fluid waste. The size of the particles to be removed may be determined by formation properties, anticipated pumping schedules, and/or injection modeling software. For example, formations of higher porosity (e.g., >20%) can tolerate solids particles upwards of 1,000 microns, while formations of lower porosity (e.g., <10%) can tolerate fine particles less than 100 microns. In one example, the size of the second set of solids may be determined by analyzing the formation porosity from gamma-ray emitting tools from open-hole logs and coordinating the porosity of a disposal well 170 with an appropriate classification size. The removed particles output from the shaker 150 may be transferred to a particle size reducer 120. The second filtered drilling fluid waste from the shaker 150 may be transferred to a mixing tank 130.

The particle size reducer 120 may be or include a grinder or ball mill which may cleave, disaggregate, crush, or separate the removed (e.g., oversized) particles into particles of a predetermined (e.g., smaller) size. For example, the particles may be reduced to a size that allows the particles to pass through a filter in the shaker 150 and be sent to a mixing tank 130. Once the particles have been reduced in size, they may be transferred into the mixing tank 130.

The mixing tank 130 may collect, mix, and agitate the second filtered drilling fluid waste from the shaker 150 and/or the reduced-in-size particles from the particle size reducer 120 to produce a substantially homogeneous slurry. In at least one embodiment, other additives may be added to the slurry in the mixing tank 130.

A portion of the slurry from the mixing tank 130 may be transferred to one or more valves (five are shown: 145A-145E) via a pump 140. In addition to causing the slurry to flow to the valves 145A-145E, the pump 140 may also perform a secondary grinding of the particles in the slurry (e.g., to further reduce the size of the particles). The valve 145A may transfer a portion of the slurry back to the mixing tank 130 for agitation purposes, as determined by a programmable logic controller or "PLC" 175 (described below). This portion of the slurry may re-enter the mixing tank 130 through a series of mud guns located at the bottom of the mixing tank 130. In one embodiment, the recirculation line is approximately a constant 20-30% of total volumetric output from the pump 140.

The valve 145B may transfer a portion of the slurry back to the shaker 150 to re-filter the material to ensure proper particle sizes, as determined by the PLC 175. The valve 145C may transfer a portion of the slurry to a storage vessel 195 for temporary storage and subsequent injection into the disposal well 170, as determined by the PLC 175. The valve 145D may transfer a portion of the slurry to an injection pump 165 (described below), which injects the slurry down into the disposal well 170, as determined by the PLC 175. The valve 145E may transfer a portion of the slurry back to the particle size reducer 120 to assist in material flux through the particle size reducer 120, as determined by the PLC 175. This may prevent solids from packing off, bridging, or plugging the particle size reducer 120.

The PLC 175 may use inputs, data records, and a feedback loop to adjust the system 100. As shown, the PLC 175 may be connected to one or more sensors 125, 155, 185, one or more valves 135, 145A-145E, 160, one or more pumps 165, a data storage 180, and a computing system 190.

The sensor 125 may be configured to measure one or more properties of the slurry that is being re-introduced back into the mixing tank 130 (e.g., the slurry flowing between the valve 145A and the mixing tank 130). The sensor 155 may be configured to measure one or more properties of the slurry that is being injected into the disposal well 170 (e.g., between the injection pump 165 and the disposal well 170).

The sensor 185 may be configured to measure one or more properties of the slurry, the disposal well 170, and/or the subterranean formation surrounding the disposal well 170. For example, the sensor 185 may be positioned at the wellhead of the disposal well 170 or in the disposal well 170. The properties measured by the sensors 125, 155, 185 may be or include the flowrate, the viscosity, the density, the percentage of solids, the number or amount of suspended solids per unit volume, the pressure, and/or the temperature of/in the slurry. For example, the sensor 125 may be or include a densitometer or a viscometer, the sensor 155 may measure the flow rate of the slurry being injected into the disposal well 170, and the sensor 185 may measure the pressure (e.g., of the slurry or other fluids) at the wellhead. The measurements from the sensors 125, 155, 185 may be transmitted to the PLC 175.

The valve 135 may be configured to prefill and/or regulate the volume of other fluids (e.g., drilling mud, produced water, brackish water) that is introduced into the mixing tank 130, depending on the properties of the slurry in the mix tank 130. The valve 160 may regulate the volume of additives (e.g., viscosifiers, barite, polymer, water) to the slurry to control the rheological properties of the slurry. For example, the additives may be added to the slurry in response to the properties measured by the sensor 125. The valves 135, 160 may be controlled by the PLC 175.

The properties of the slurry may depend at least partially on the subterranean formation. For example, to carry particles deep within the disposal formation, the viscosity should be sufficient to prevent premature settling. In the system 100, the viscosity may be increased with barite or polymer additives using a series of viscometers, one or more polymer feed pumps with variable frequency drives, and the PLC 175. In another embodiment, the viscosity may be measured, and the polymer additives may be introduced manually in response to the measurements.

To assist in achieving proper bottom-hole pressure (i.e., the primary force that induces flowrate through, and fracturing of, the formation), the density of the slurry may be maintained or modified to be sufficient to increase the hydrostatic pressure inside of the fluid column of the disposal well 170. In the system 100, the density may be controlled by adding barite automatically with a barite feed auger in response to transmitting measurements from one or more densitometers to the PLC 175. In another embodiment, the slurry may be manually weighed, and sacks of barite may be introduced in response to the weight.

The injection rate may be set so as to provide a predetermined surface pressure and may, in some implementations propagate fracture growth in the subterranean formation of the disposal well 170. The injection rate may be controlled with the injection pump 165 automatically through a series of pressure sensors, flow meters, densitometers, and the PLC 175. In another embodiment, the injection rate may be controlled manually by adjusting a variable frequency drive of the injection pump 165.

The fluid properties of the injected slurry may vary depending upon the operational schedule of the pump(s) 140, 196, and/or 165 or how the formation of the disposal well 170 is responding to the injection event. For example, if a gradual increase in the measured surface pressure occurs with no change in the injection rate, this may indicate filter cake build-up at the perforations in the subterranean formation surrounding the disposal well 170. In response to this, the user may deviate from the initial injection slurry by decreasing the density and/or viscosity of the slurry and increasing the injection rate to shear the solids build-up.

The PLC 175 may be configured to store the measurements from the sensors 125, 155, 185 in a data storage 180. In one specific embodiment, the data storage 180 may be a cloud-based server. The computing system 190 and/or the PLC 175 may be used to retrieve the measured properties from the data storage 180 and/or monitor the measured properties. In response to the measured properties, the computing system 190 and/or the PLC 175 may then actuate one or more of the valves 135, 145A-145E, 160.

Figure 2:
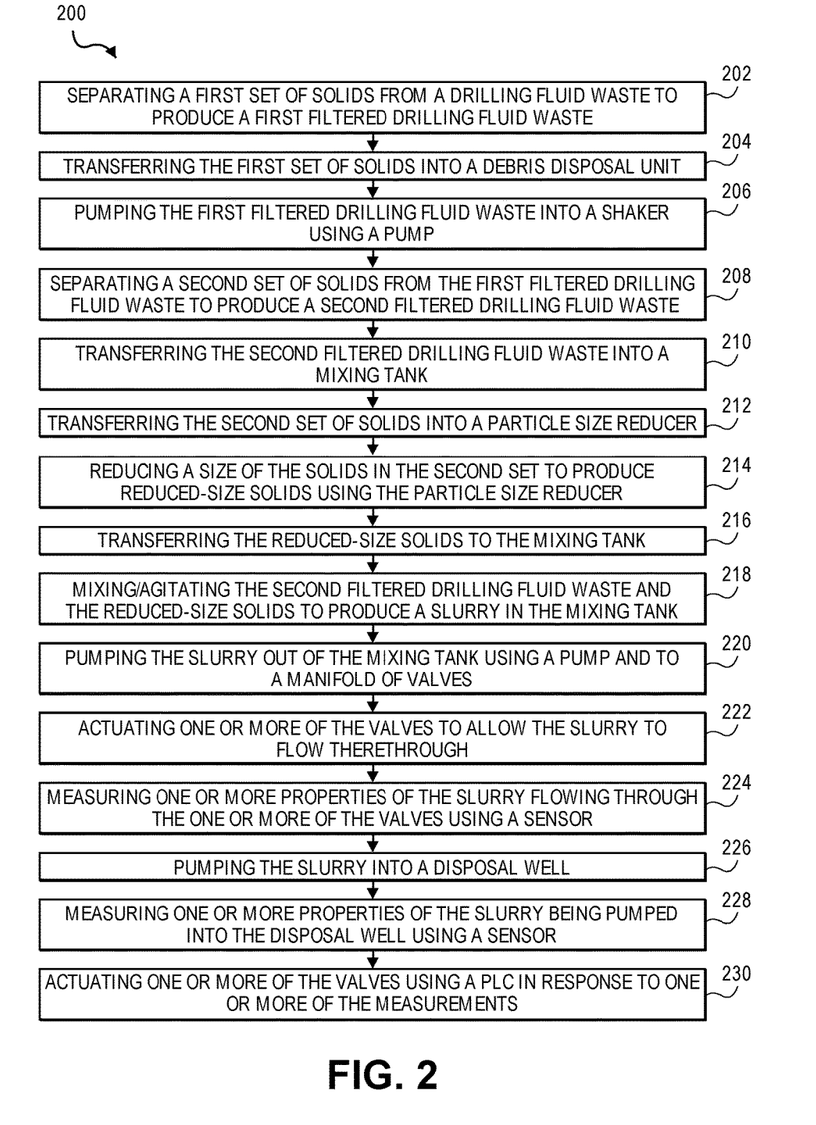
FIG. 2 illustrates a flowchart of a method for injecting a portion of a drilling fluid waste into a well, according to an embodiment.

FIG. 2 illustrates a flowchart of a method 200 for injecting a portion of a drilling fluid waste into the disposal well 170, according to an embodiment. The method 200 may include separating a first set of solids from the drilling fluid waste to produce a first filtered drilling fluid waste, as at 202. The separation at 202 may take place using the strainer 105. The method 200 may also include transferring the first set of solids into the debris disposal unit 110, as at 204. The method 200 may also include pumping the first filtered drilling fluid waste into the shaker 150 using the pump 115, as at 206. The method 200 may also include separating a second set of solids from the first filtered drilling fluid waste to produce a second filtered drilling fluid waste, as at 208. The separation at 208 may take place using the shaker 150. The method 200 may also include transferring the second filtered drilling fluid waste into the mixing tank 130, as at 210. The method 200 may also include transferring the second set of solids into the particle size reducer 120, as at 212.

The method 200 may also include reducing a size of the solids in the second set to produce reduced-size solids using the particle size reducer (e.g., grinder) 120, as at 214. The method 200 may also include transferring the reduced-size solids to the mixing tank 130, as at 216. The method 200 may also include mixing/agitating the second filtered drilling fluid waste and the reduced-size solids to produce a slurry in the mixing tank 130, as at 218.

The method 200 may include pumping the slurry out of the mixing tank 130 using the pump 140 and to a manifold of valves 145A-145E, as at 220. The method 200 may include actuating one or more of the valves 145A-145E to allow the slurry to flow therethrough, using the PLC 175 and/or the computing system 190, as at 222. For example, the slurry may flow through the valve 145A and back to the mixing tank 130, through the valve 145B and back into the shaker 150, through the valve 145C and into the storage vessel 195, through the valve 145D and to the injection pump 165, and/or through the valve 145E and to the particle size reducer (e.g., grinder) 120.

The method 200 may include measuring one or more properties of the slurry flowing through the one or more of the valves (e.g., valve 145A) using the sensor 125 (and transmitting the measurement to the PLC 175, the data storage 180, and/or the computing system 190), as at 224. The method 200 may include pumping the slurry into the disposal well 170, as at 226. For example, the slurry may be temporarily stored in the storage vessel 195 and then pumped into the disposal well 170 using a transfer pump 196 and/or the injection pump 165. In another example, the slurry may bypass the storage vessel 195 and the transfer pump 196 and be pumped directly into the disposal well 170 using the injection pump 165.

The method 200 may include measuring one or more properties of the slurry being pumped into the disposal well 170 using the sensor 155 and/or one or more properties of the disposal well 170 and/or surrounding subterranean formation using the sensor 185 (and transmitting the measurement to the PLC 175, the data storage 180, and/or the computing system 190), as at 228. The method 200 may also include actuating (e.g., partially opening, fully opening, or closing) one or more of the valves 135, 145A-145E, 160 using the PLC 175 in response to one or more of the measurements, as at 230. More particularly, the one or more of the valves 135, 145A-145E, 160 may be actuated to vary one or more properties of the slurry. For example, the one or more of the valves 135, 145A-145E, 160 may be actuated to vary the percentage of solids in the slurry, the number or amount of suspended solids per unit volume in the slurry, the density of the slurry, the viscosity of the slurry, or a combination thereof.

Figure 3:
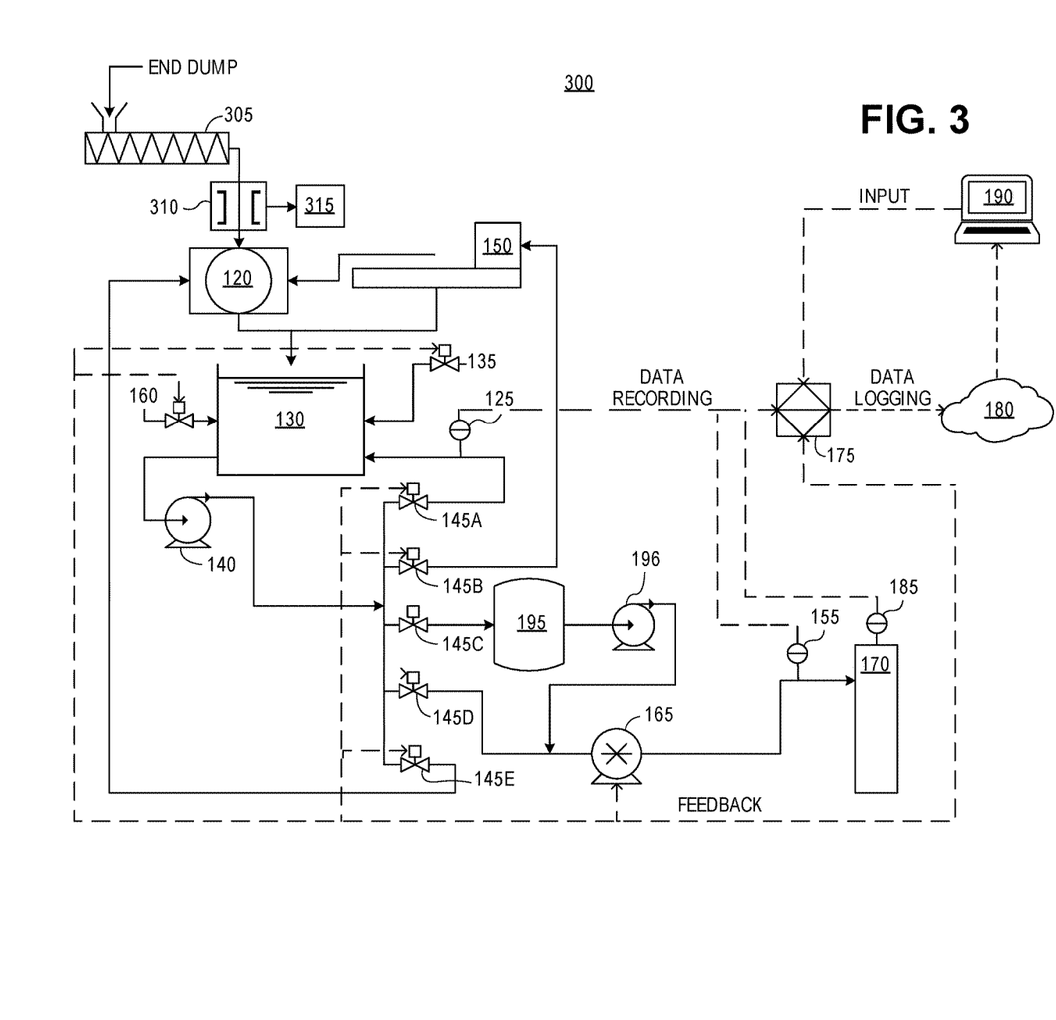
FIG. 3 illustrates a schematic view of another fluid disposal injection system, according to an embodiment.

FIG. 3 illustrates a schematic view of another fluid disposal injection system 300, according to an embodiment. The system 300 may be similar to the system 100. Instead of, or in addition to, the strainer 105 and/or the pump 115 in FIG. 1, however, the system 300 may include a conveying device 305, such as an auger, a belt conveyor, a pneumatic conveyor, or other solids conveying equipment. The conveying device 305 may transport the drilling fluid waste from a vacuum truck to a separator 310. The drilling fluid waste may include cuttings (e.g., clay) from the subterranean formation.

The separator 310 may remove solids (e.g., stones, nuts, bolts, rags, gloves, etc.) from the drilling fluid waste to prevent the solids from damaging the particle size reducer 120. In one embodiment, the separator 310 may be or include a magnet that is configured to remove metallic solids from the drilling fluid waste. The solids may be transferred into a debris disposal unit 315, which may be similar to the debris disposal unit 110 above. Removing the solids may produce a first filtered drilling fluid waste, which may be introduced into the particle size reducer 120. The components downstream from the particle size reducer 120 in FIG. 3 may be substantially the same as the components in FIG. 1.

Figure 4:
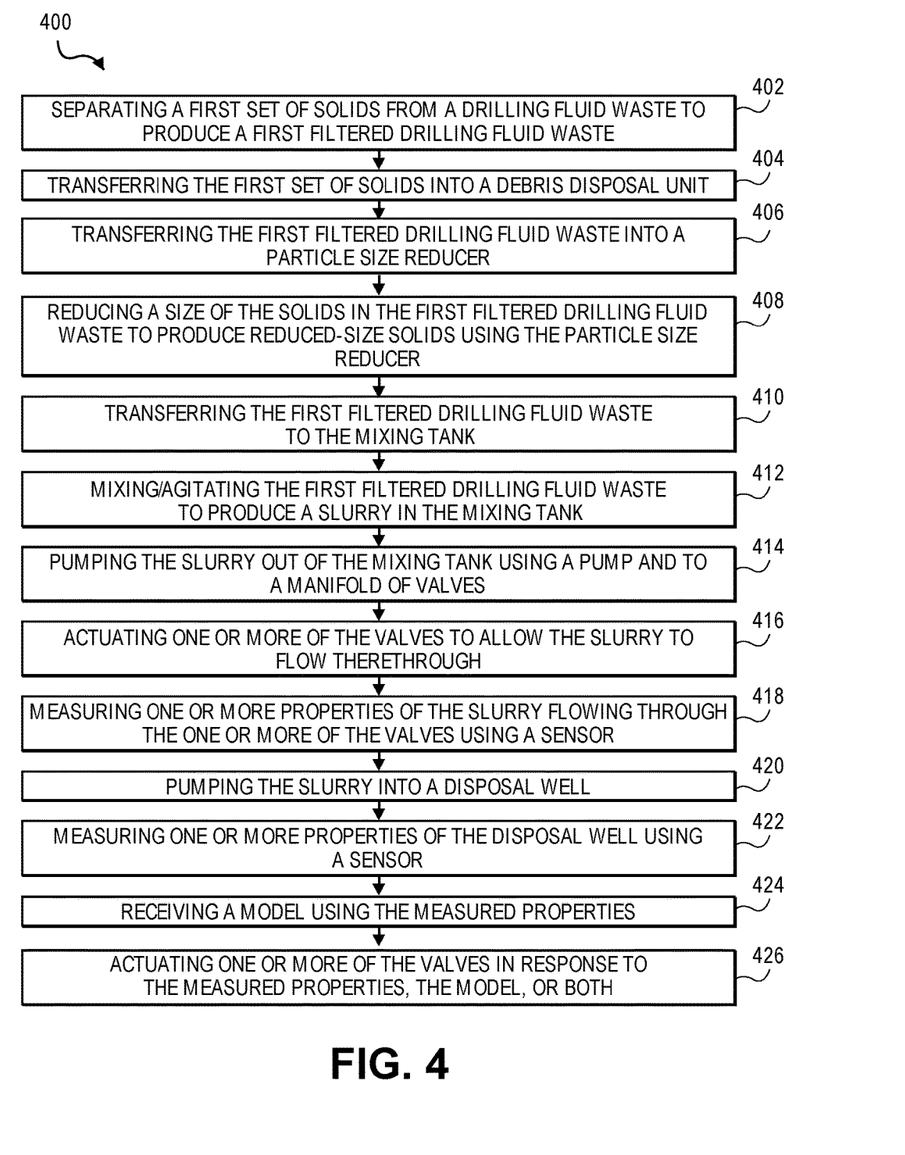
FIG. 4 illustrates a flowchart of another method for injecting a portion of a drilling fluid waste into a well, according to an embodiment.

FIG. 4 illustrates a flowchart of another method 400 for injecting a portion of a drilling fluid waste into the well 170, according to an embodiment. The method 400 may include separating a first set of solids from the drilling fluid waste to produce a first filtered drilling fluid waste, as at 402. The separation at 402 may take place using the separator 310. The method 400 may also include transferring the first set of solids into the debris disposal unit 315, as at 404. The method 400 may also include transferring the first filtered drilling fluid waste into the particle size reducer 120, as at 406. Thus, in contrast to the method 200, in which the first filtered drilling fluid waste is transferred into the shaker 150, in the method 400, the first filtered drilling fluid waste may bypass the shaker 150 and be introduced directly into the particle size reducer 120.

The method 400 may also include reducing a size of the solids in the first filtered drilling fluid waste using the particle size reducer (e.g., grinder) 120, as at 408. The method 400 may also include transferring the first filtered drilling fluid waste, with the smaller particles, to the mixing tank 130, as at 410. The method 400 may also include mixing/agitating the first filtered drilling fluid waste, with the smaller particles, to produce a slurry in the mixing tank 130, as at 412. The steps 414-420 in FIG. 4 may be similar to steps 220-226 in FIG. 2 and are not described again here in detail.

The method 400 may also include measuring one or more properties of the disposal well 170 using the sensor 185, as at 422. In one embodiment, the sensor 185 may be part of a downhole tool in the disposal well 170, and the properties may be or include (e.g., real-time) open-hole log data captured in the disposal well 170. In other embodiments, the sensor 185 may be located at the surface and downhole properties may be inferred based on the measurements taken by the sensor 185. For example, the properties measured by the sensor 185 may be or include the permeability, porosity, in-situ stress, the number and size (e.g., width) of the fractures, and/or additional rock mechanics of the subterranean formation surrounding the disposal well 170.

The method 400 may also include receiving a model, using the PLC 175 and/or the computing system 190, as at 424. The model may show how the disposal well 170 reacts in response to the injection of the slurry. For example, the model may map in-situ formation flow or illustrate the size (e.g., width and/or length) of fracture propagations along several perforated intervals, thus allowing operators to confirm that the injection is environmentally safe. The model may be based upon the properties of the slurry (e.g., measured by sensors 125, 155) and/or the properties of the disposal well 170 and the surrounding subterranean formation (e.g., measured by sensor 185).

In response to the model, the PLC 175 and/or the computing system 190 may determine the health of the disposal well 170, the containment and disposal zones in the disposal well 170, the number and size of the fractures in the disposal well 170, or a combination thereof. In another embodiment, the model may be used to estimate the total (e.g., volumetric) disposal capacity of the disposal well 170. For example, the life of the disposal well 170 may be correlated to a leak-off rate, or the rate the disposal well 170 reaches in-situ pressure after the injection event. Measuring and projecting leak-off rates allows the operator to estimate the volumetric capacity of the disposal well 170. In another embodiment, the model may be used to determine maximum injection flow rates into the disposal well 170 without causing the disposal well 170 to overflow or without causing a pressure in the disposal well 170 to exceed a predetermined pressure. For example, modeling the injection rate may allow the surface equipment to be properly sized or scaled and may allow the user to use the appropriate pipe pressure standards. In another embodiment, the model may be used as a diagnostic tool for the disposal well 170. For example, leak-off rates that fall outside of expected rates can indicate the existence of near-well damage, clogged perforations, or loss of containment within the subterranean disposal zone. In another embodiment, the model may be used to provide a sensitivity analysis through injection simulation. For example, simulations can be used in a "what-if" analysis that will allow the operator to identify risks within a given stress test (e.g., with surface equipment or logic fails, if slurry properties are not optimized, or the disposal well 170 should be shut down for a workover).

The method 400 may also include actuating (e.g., partially opening, fully opening, or closing) one or more of the valves 135, 145A-145E, 160 using the PLC 175 and/or the computing system in response to one or more of the measurements, in response to the model, or both, as at 426. More particularly, the one or more of the valves 135, 145A-145E, 160 may be actuated to vary one or more properties (e.g., percentage of solids, the number or amount of suspended solids per unit volume, the density, the viscosity, etc.) of/in the slurry in response to the model. For example, the one or more of the valves 135, 145A-145E, 160 may be actuated to introduce an additive (e.g., clay, barite, a polymer, a portion of the slurry after the particles are removed or reduced in size, etc.) into the slurry to vary one or more properties of the slurry. In some embodiments, a property of the disposal well 170 and/or the surrounding subterranean formation (permeability, porosity, in-situ stress, the number and size of the fractures) may vary in response to the property of the slurry being varied.

In order to carry the particles in the slurry deep within the disposal well 170, the viscosity of the slurry may be maintained at greater than a predetermined threshold to prevent premature settling. In one example, the viscosity may be increased by adding more clay-rich cuttings into the slurry (e.g., through valve 135 or valve 160). Processed cuttings that are rich in clay may increase the slurry viscosity as compared to cuttings rich with sand or feldspar, because the cuttings rich with sand or feldspar contribute to suspended solids concentration with little or no effect on the viscosity of the slurry and minimal effect on the density of the slurry.

The type of cuttings may be determined through visual inspection. More particularly, clay-rich cuttings may appear dull in color and soft, while cuttings with quartz or feldspar may appear glossy, grainy, and hard. Cuttings rich in sand or feldspar may be added to the slurry when the viscosity is already above the predetermined threshold. Barite or polymer additives may be introduced into the slurry as a substitute for (or in addition to) clay. The clay, barite, and/or polymer may be added to increase the viscosity using a one or more polymer feed pumps with variable frequency drives. A series of viscometers may be employed to measure the viscosity increase, and the PLC 175 may employ these measurements in a feedback loop, to control the addition of the clay, barite, and/or polymer. In another embodiment, the viscosity may be measured, and the clay, barite, or polymer may be introduced manually in response to the measurements. If too much clay is added, the flow rate of the slurry may decrease below a predetermined threshold. If too much feldspar or quartz is added to the slurry, the viscosity of the slurry may increase above a predetermined threshold such that the slurry is unable to promote suspension of particles through the subterranean formation.

Figure 5:
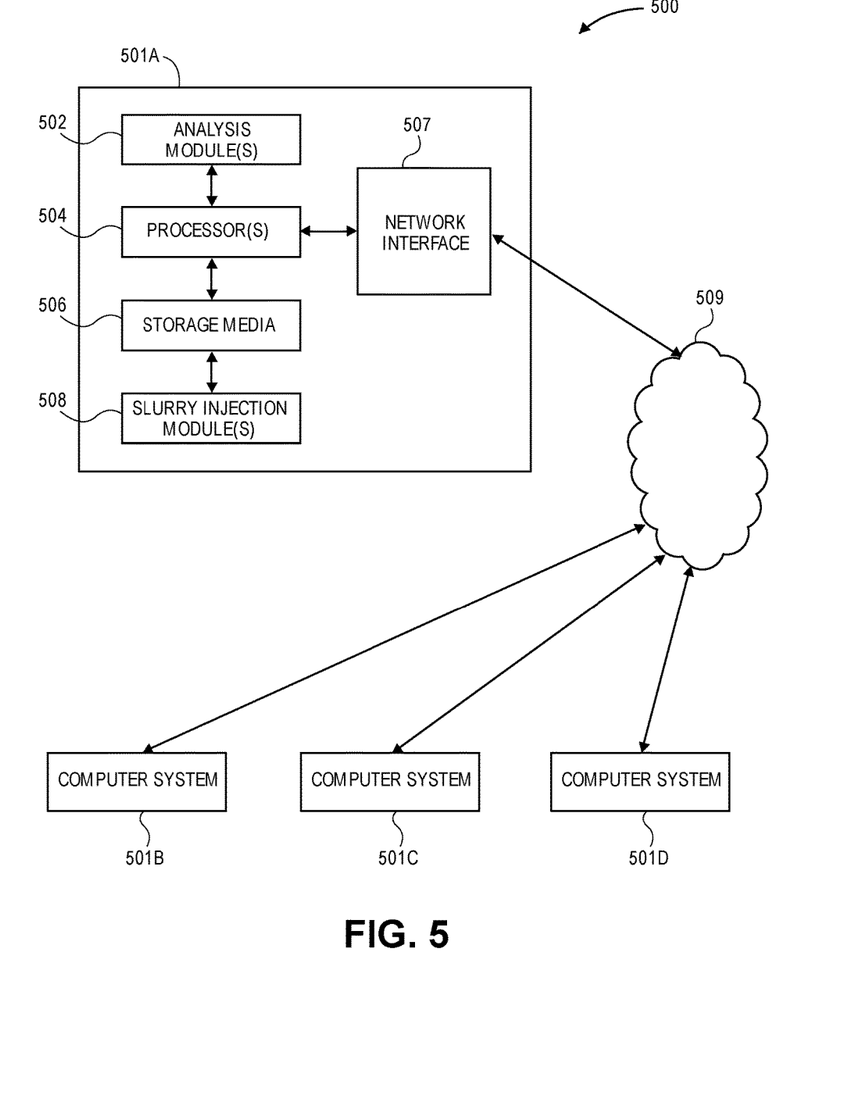
FIG. 5 illustrates an example of a computing system for performing at least a portion of one of the methods, according to an embodiment.

FIG. 5 illustrates a schematic view of a computing system 500, which may provide the computing system 190 of FIG. 1 and/or FIG. 3, according to an embodiment. The computing system 500 may include a computer or computer system 501A, which may be an individual computer system 501A or an arrangement of distributed computer systems. The computer system 501A includes one or more analysis module(s) 502 configured to perform various tasks according to some embodiments, such as one or more methods disclosed herein. To perform these various tasks, the analysis module 502 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor can include a microprocessor, microcontroller, processor module or subsystem, programmable integrated circuit, programmable gate array, or another control or computing device.

The storage media 506 can be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 500 contains one or more slurry injection module(s) 508. In the example of computing system 500, computer system 501A includes the slurry injection module 508. In some embodiments, a single slurry injection module 508 may be used to perform at least some aspects of one or more embodiments of the methods. In other embodiments, a plurality of slurry injection modules 508 may be used to perform at least some aspects of the methods.

It should be appreciated that computing system 500 is one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the invention.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for injecting a portion of a drilling fluid waste into a well, comprising:
    reducing a cross-sectional dimension of solids in a slurry, wherein the slurry includes the drilling fluid waste;
    measuring a property of the slurry, of the well, or both;
    obtaining a model based at least partially upon the property, wherein the model represents an interaction of the slurry with the well;
    introducing an additive into the slurry based at least partially upon the property, the model, or both, wherein measuring the property, obtaining the model, and introducing the additive are part of a feedback loop to control an amount of the additive that is introduced into the slurry; and
    injecting the slurry into the well after the additive is introduced.

2. The method of claim 1, wherein measuring the property comprises measuring a first property of the slurry and a second property of the well, wherein the model is based at least partially upon the first and second properties.

3. The method of claim 2, wherein the additive is introduced in response to measuring the first property, measuring the second property, and obtaining the model.

4. The method of claim 3, wherein the first property comprises a number or amount of the solids in the slurry that are suspended per unit volume, a density of the slurry, or a viscosity of the slurry, and wherein the second property comprises a permeability of a subterranean formation surrounding the well, a porosity of the subterranean formation surrounding the well, an in-situ stress of the subterranean formation surrounding the well, a number of fractures in the subterranean formation surrounding the well, or a size of the fractures in the subterranean formation surrounding the well.

5. The method of claim 1, further comprising determining a volumetric disposal capacity of the well using the model.

6. The method of claim 1, further comprising determining a maximum rate at which the slurry is injected without causing a pressure in the well to exceed a predetermined pressure using the model, wherein a rate that the slurry is injected is less than or equal to the maximum rate.

7. The method of claim 1, wherein the property comprises a viscosity of the slurry, and wherein the additive comprises clay, barite, or a polymer, which increases the viscosity of the slurry.

8. The method of claim 7, wherein the additive also comprises sand, feldspar, or both, and wherein the sand, feldspar, or both is introduced to the slurry when the viscosity is above a predetermined threshold.

9. The method of claim 1, wherein the property comprises a density of the slurry, and wherein the additive comprises clay, barite, or a polymer, which increases the density of the slurry.

10. The method of claim 1, wherein the model illustrates in-situ formation flow or a size of fracture propagations.

11. The method of claim 1, further comprising:
    determining a leak-off rate of the well using the model; and
    determining a volumetric disposal capacity of the well based at least partially upon the leak-off rate of the well.

12. The method of claim 1, further comprising actuating a valve in response to the property, the model, or both, wherein, in response to actuating the valve, at least a portion of the slurry flows out of a tank, through the valve, and back into the tank prior to being injected into the well.

13. A method for injecting a portion of a drilling fluid waste into a well, comprising:
    reducing a cross-sectional dimension of solids in a slurry, wherein the slurry includes the drilling fluid waste;
    measuring a first property of the slurry after the cross-sectional dimension is reduced;
    measuring a second property of the well;
    obtaining a model based at least partially upon the first property and the second property, wherein the model represents an interaction of the slurry with the well;
    determining, in response to the model, a disposal capacity of the well or a maximum rate at which the slurry is injected into the well without causing a pressure in the well to exceed a predetermined amount;
    introducing an additive to the slurry in response to determining the disposal capacity or the maximum rate, wherein measuring the first and second properties, obtaining the model, and introducing the additive are part of a feedback loop to control an amount of the additive that is introduced into the slurry; and
    injecting the slurry into the well after the additive is introduced.

14. The method of claim 13, wherein introducing the additive comprises actuating a valve in response to measuring the first and second properties, obtaining the model, or both, and wherein, in response to actuating the valve, the slurry flows out of a tank, through the valve, and back into the tank.

15. The method of claim 14, wherein method further comprises measuring the first property after the slurry flows through the valve and before the slurry flows back into the tank.

16. The method of claim 13, wherein introducing the additive comprises actuating a valve in response to measuring the first and second properties, obtaining the model, or both, wherein, in response to actuating the valve, the slurry flows out of a tank, through the valve, into a shaker that separates a portion of the solids from the slurry, and back into the tank.

17. The method of claim 13, further comprising actuating a valve in response to measuring the first and second properties, obtaining the model, or both, and wherein, in response to actuating the valve, the slurry flows out of a tank, through the valve, and into a storage vessel.

18. The method of claim 13, further comprising actuating a valve in response to measuring the first and second properties, obtaining the model, or both, and wherein, in response to actuating the valve, the slurry flows out of a tank, through the valve, and into the well.

19. The method of claim 18, wherein the property is measured after the slurry flows through the valve and before the slurry is injected into the well.

20. The method of claim 13, wherein the reduction in the cross-sectional dimension of the solids occurs in a grinder, wherein introducing the additive comprises actuating a valve in response to measuring the first and second properties, generating the model, or both, and wherein, in response to actuating the valve, the slurry flows out of a tank, through the valve, into the grinder, and back into the tank.

21. A computing system comprising:
one or more processors; and
a memory system comprising one or more non-transitory computer-readable media storing instructions that, when executed by at least one of the one or more processors, cause the computing system to perform operations, the operations comprising:
reducing a cross-sectional dimension of solids in a slurry, wherein the slurry includes a drilling fluid waste;
measuring a first property of the slurry after the cross-sectional dimension is reduced;
measuring a second property of a well;
obtaining a model based at least partially upon the first property and the second property, wherein the model represents an interaction of the slurry with the well;
determining, in response to the model, a disposal capacity of the well or a maximum rate at which the slurry is injected into the well without causing a pressure in the well to exceed a predetermined amount;
introducing an additive to the slurry in response to determining the disposal capacity or the maximum rate, wherein measuring the first and second properties, obtaining the model, and introducing the additive are part of a feedback loop to control an amount of the additive that is introduced into the slurry; and
injecting the slurry into the well after the additive is introduced.

22. The computing system of claim 21, wherein the first property comprises a number or amount of the solids in the slurry that are suspended per unit volume, a density of the slurry, or a viscosity of the slurry, and wherein the second property comprises a permeability of a subterranean formation surrounding the well, a porosity of the subterranean formation surrounding the well, an in-situ stress of the subterranean formation surrounding the well, a number of fractures in the subterranean formation surrounding the well, or a size of the fractures in the subterranean formation surrounding the well.

* * * * * cx

(12) EX PARTE REEXAMINATION CERTIFICATE (11710th)
United States Patent
Blackwell et al.

(10) Number: US 10,180,036 C1
(45) Certificate Issued: Aug. 5, 2020

(54) DRILLING FLUID DISPOSAL INJECTION SYSTEM AND METHOD

(71) Applicant: Milestone Environmental Services, LLC, Houston, TX (US)

(72) Inventors: Mark Blackwell, Houston, TX (US); Steve Bills, Houston, TX (US); Jason Larchar, Spring, TX (US)

(73) Assignee: MILESTONE ENVIRONMENTAL SERVICES, LLC., Houston, TX (US)

Reexamination Request:
No. 90/014,326, Jun. 26, 2019

Reexamination Certificate for:
Patent No.: 10,180,036
Issued: Jan. 15, 2019
Appl. No.: 15/662,991
Filed: Jul. 28, 2017

Related U.S. Application Data (63) Continuation-in-part of application No. 15/596,580, filed on May 16, 2017, now Pat. No. 10,132,140.

(60) Provisional application No. 62/337,523, filed on May 17, 2016, provisional application No. 62/367,816, filed on Jul. 28, 2016.

(51) Int. Cl.
*E21B 21/06* (2006.01)
*E21B 41/00* (2006.01)
*E21B 49/00* (2006.01)
*G05B 15/02* (2006.01)

(52) U.S. Cl.
CPC ............ *E21B 21/06* (2013.01); *E21B 21/066* (2013.01); *E21B 41/0057* (2013.01); *E21B 49/00* (2013.01); *E21B 49/006* (2013.01); *G05B 15/02* (2013.01)

(58) Field of Classification Search
None
See application file for complete search history.

(56) References Cited

To view the complete listing of prior art documents cited during the proceeding for Reexamination Control Number 90/014,326, please refer to the USPTO's public Patent Application Information Retrieval (PAIR) system under the Display References tab.

*Primary Examiner* — Catherine S Williams (57) ABSTRACT

A portion of a drilling fluid waste is injected into a well. A cross-sectional dimension of solids in a slurry is reduced. The slurry includes the drilling fluid waste. A property of the slurry, of the well, or both is measured. A model is obtained based at least partially upon the property. The model represents an interaction of the slurry with the well. An additive is introduced into the slurry in response to measuring the property, generating the model, or both. The slurry is injected into the well after the additive is introduced.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 16-18 are cancelled.

Claims 1, 13, 19 and 21 are determined to be patentable as amended.

Claims 2-12, 14-15, 20 and 22, dependent on an amended claim, are determined to be patentable.

New claim 23 is added and determined to be patentable.

1. A method for injecting a portion of a drilling fluid waste into a well, comprising:
reducing a cross-sectional dimension of solids in a slurry, wherein the slurry includes the drilling fluid waste;
measuring a property of the slurry, of the well, or both;
obtaining a model based at least partially upon the property, wherein the model represents an interaction of the slurry with the well;
introducing, *in a mixing tank that is downstream from the shaker and the particle size reducer,* an additive into the slurry based at least partially upon the property, the model, or both, wherein measuring the property, obtaining the model, and introducing the additive are part of a feedback loop to control an amount of the additive that is introduced into the slurry; [and]
*pumping, using a pump, the slurry from the mixing tank to a manifold of valves;*
*controlling the manifold of valves to selectively flow the slurry from the pump to the shaker, the particle size reducer, the mixing tank, and the well, wherein controlling the manifold of valves comprises:*
*controlling a first valve to selectively flow the slurry from downstream of the mixing tank back to the mixing tank based at least partially upon the property and the model;*
*controlling a second valve to selectively flow the slurry from downstream of the mixing tank to the shaker based at least partially upon the property and the model;*
*controlling a third valve to selectively flow the slurry from downstream of the mixing tank to the particle size reducer based at least partially upon the property and the model;*
*controlling a fourth valve to selectively flow the slurry to an injection pump based at least partially upon the property and the model; and*
injecting the slurry into the well after the additive is introduced.

13. A method for injecting a portion of a drilling fluid waste into a well, comprising:
reducing a cross-sectional dimension of solids in a slurry, wherein the slurry includes the drilling fluid waste;
measuring a first property of the slurry after the cross-sectional dimension is reduced;
measuring a second property of the well;
obtaining a model based at least partially upon the first property and the second property, wherein the model represents an interaction of the slurry with the well;
determining, in response to the model, a disposal capacity of the well or a maximum rate at which the slurry is injected into the well without causing a pressure in the well to exceed a predetermined amount;
introducing an additive to the slurry, *in a mixing tank that is downstream from the shaker and the particle size reducer,* in response to determining the disposal capacity or the maximum rate, wherein measuring the first and second properties, obtaining the model, and introducing the additive are part of a feedback loop to control an amount of the additive that is introduced into the slurry;
*pumping, using a pump, the slurry from the mixing tank to a manifold of valves;*
*controlling the manifold of valves to selectively flow the slurry from the pump to the shaker, the particle size reducer, the mixing tank, and the well, wherein controlling the manifold of valves comprises:*
*controlling a first valve to selectively flow the slurry from downstream of the mixing tank back to the mixing tank based at least partially upon the first property, the second property, or both and the model;*
*controlling a second valve to selectively flow the slurry from downstream of the mixing tank to the shaker based at least partially upon the first property, the second property, or both and the model;*
*controlling a third valve to selectively flow the slurry from downstream of the mixing tank to the particle size reducer based at least partially upon the first property, the second property, or both and the model; and*
*controlling a fourth valve to selectively flow the slurry to an injection pump based at least partially upon the first property, the second property, or both and the model;* and
injecting the slurry into the well after the additive is introduced.

19. The method of claim [18] *13*, wherein the *first* property is measured after the slurry flows through the *fourth* valve and before the slurry is injected into the well.

21. A computing system comprising:
one or more processors; and
a memory system comprising one or more non-transitory computer-readable media storing instructions that, when executed by at least one of the one or more processors, cause the computing system to perform operations, the operations comprising:
reducing a cross-sectional dimension of solids in a slurry, wherein the slurry includes a drilling fluid waste;
measuring a first property of the slurry after the cross-sectional dimension is reduced;
measuring a second property of a well;
obtaining a model based at least partially upon the first property and the second property, wherein the model represents an interaction of the slurry with the well;
determining, in response to the model, a disposal capacity of the well or a maximum rate at which the slurry is injected into the well without causing a pressure in the well to exceed a predetermined amount;
introducing, *in a mixing tank that is downstream from the shaker and the particle size reducer,* an additive to the slurry in response to determining the disposal capacity or the maximum rate, wherein measuring the first and second properties, obtaining the model, and introducing the additive are part of a feedback loop to control an amount of the additive that is introduced into the slurry;

pumping, using a pump, the slurry from the mixing tank to a manifold of valves;

controlling the manifold of valves to selectively flow the slurry from the pump to the shaker, the particle size reducer, the mixing tank, and the well, wherein controlling the manifold of valves comprises:

controlling a first valve to selectively flow the slurry from downstream of the mixing tank back to the mixing tank based at least partially upon the first property, the second property, or both;

controlling a second valve to selectively flow the slurry from downstream of the mixing tank to the shaker based at least partially upon the first property, the second property, or both;

controlling a third valve to selectively flow the slurry from downstream of the mixing tank to the particle size reducer based at least partially upon the first property, the second property, or both; and controlling a fourth valve to selectively flow the slurry to an injection pump based at least partially upon the first property, the second property, or both; and injecting the slurry into the well after the additive is introduced.

23. The method of claim 1, further comprising:

measuring a porosity of a formation through which the well extends;

correlating a maximum size of cuttings in the slurry with the porosity of the formation;

operating a shaker to control the maximum size of cuttings in the slurry; and passing through the shaker one or more times prior to injecting the slurry into the well.

* * * * *